US012758808B2

(12) United States Patent
DelPapa

(10) Patent No.: US 12,758,808 B2
(45) Date of Patent: Oct. 13, 2026

(54) VENT VALVE EXTINGUISHER FOR ABOVE GROUND STORAGE TANKS

(71) Applicant: Charles DelPapa, Mooringsport, LA (US)

(72) Inventor: Charles DelPapa, Mooringsport, LA (US)

( * ) Notice: Subject to any disclaimer, the term of this patent is extended or adjusted under 35 U.S.C. 154(b) by 175 days.

(21) Appl. No.: 18/807,054

(22) Filed: Aug. 16, 2024

(65) Prior Publication Data

US 2026/0048284 A1 Feb. 19, 2026

(51) Int. Cl.
*A62C 3/00* (2006.01)
*A62C 2/04* (2006.01)
*A62C 37/36* (2006.01)

(52) U.S. Cl.
CPC ................ *A62C 3/002* (2013.01); *A62C 2/04* (2013.01); *A62C 37/04* (2013.01)

(58) Field of Classification Search
CPC .. A62C 3/002; A62C 3/06; A62C 2/04; A62C 37/04; A62C 99/0018; E21B 35/00
USPC ........ 169/11, 60, 61, 66, 69, 70; 239/69, 71, 239/72; 220/88.1, 88.2
See application file for complete search history.

(56) References Cited

U.S. PATENT DOCUMENTS 4,433,733 A * 2/1984 Cunningham .......... E21B 35/00 169/69
6,216,790 B1 * 4/2001 Webb ........................ B67D 7/84 169/66
8,955,609 B2 * 2/2015 Phillips .................. A62C 37/11 169/60

* cited by examiner

*Primary Examiner* — Steven J Ganey

(57) ABSTRACT

This invention is a vent pipe extinguisher for an above ground tank. The invention uses an inert gas to smother the fire occurring at a vent valve included in a vent pipe. The invention uses a rotating door to block the flow of flammable gas from the vent pipe to the vent valve. The invention further uses a tag and cord system to release the rotating door and to visually and audibly indicate when the vent pipe extinguisher has been activated to extinguish a fire.

14 Claims, 8 Drawing Sheets

Figure 1 – Prior Art

Figure 2 – Prior Art

VENT VALVE EXTINGUISHER FOR ABOVE GROUND STORAGE TANKS

FIELD OF THE INVENTION

This invention relates to the field of above ground storage tanks (ASTs) for storing ignitable liquids, and particularly to methods and devices for extinguishing fires at AST vent pipes.

BACKGROUND OF THE INVENTION

Above ground storage tanks (ASTs) utilized for storing ignitable liquids necessitate careful design and maintenance to mitigate safety risks associated with the accumulation of vapors. One ubiquitous safety risk measure is ensuring that each AST is equipped with an exhaust vent pipe for safely releasing potentially hazardous gasses that result from storing the ignitable liquid.

The exhaust vent pipe serves a critical role in preventing the buildup of pressure within the tank due to vaporization of the stored ignitable liquids. Ignitable liquids, such as fuels or solvents, have low flash points and can readily vaporize at ambient temperatures, thereby creating volatile atmospheres within the tank. Without proper venting, these vapors can accumulate and potentially lead to dangerous conditions such as fire or explosion.

The exhaust vent pipe operates based on the principle of pressure differentials. As the temperature changes or liquid is withdrawn from the tank, vapors, which are typically ignitable (e.g., flammable) are generated and seek to escape. The vent pipe provides a controlled pathway for these vapors to exit the tank and be expelled into the atmosphere.

The gases expelled through the vent pipe consist primarily of vapors from the stored ignitable liquids. These vapors are typically a mixture of volatile organic compounds (VOCs) and other hydrocarbons, depending on the specific composition of the liquid being stored. The composition of these gases can vary widely and may include substances such as methane, benzene, toluene, and xylene, among others.

The design of the vent pipe ensures that it is positioned at an appropriate height above the tank to prevent the ingress of rainwater or other contaminants while allowing for the efficient release of vapors. Additionally, the vent pipe may include features such as flame arrestors or pressure relief valves to further enhance safety by preventing flashback or excessive pressure buildup.

FIG. 1 depicts a conventional environment 100 for processing and storing a flammable liquid. The environment comprises an above ground storage tank 102 (AST 102). AST 102 may be any conventional holding tank capable of holding liquids, such as, flammable liquids, crude oil, produced water, gas condensate, or similar such ignitable liquids. Typical AST 102 may be, for example, one of a fixed roof tank, floating roof tank, bunded oil tank, single skin tank, double skin tank, and the like.

AST 102 may include a conventional vent pipe 104. Vent pipe 104 may include an in-line exhaust vent valve 112. In some instances, vent valve 112 may be positioned at the highest point of vent pipe 104. By "highest point," what is meant is that the vent valve 112 is at the point on the vent pipe 104 that is the furthest away from AST 102 to prevent catching the tank on fire. Common vent valve 112 used with vent pipe 104 include Enardo valves, pressure relief valves, overflow prevention valves, vacuum relief valves, and the like.

A conventional oil and gas industry environment 200, shown in FIG. 2, also uses AST 102 in the storing and processing of oil and gas products. In typical oil and gas well production operations, oil moves from oil wells through a system of high-pressure lines to one or more holding tanks (e.g., AST 102) where the oil is then transferred to a refinery to be used in other applications, such as, for example to power combustion engines.

Additionally, gases (e.g., vapors) are often produced in the holding tank, as described above. While it is necessary to have some gas in the holding tank to prevent a fire due to the presence of air, too much gas in the holding tank is a problem due to the potential for the tank to rupture. When there is too much gas in the holding tank, the gas is released into the atmosphere through a vent pipe 104 on the top of the tank. The vent pipe 104 ordinarily is in communication with a vent valve 112 conventionally located on the highest point of the vent pipe 104 or vent pipe system (called 'vent pipe 104, herein).

It should be noted that the elements described and depicted in oil and gas environment 200 of FIG. 2 are of similar description to like elements in the environment 100 shown in FIG. 1.

Oil and gas environment 200 comprises one or more oil and gas above ground storage tanks 102 (AST 102). AST 102 may include a conventional vent pipe 104 for receiving exhaust gases produced inside AST 102, and for expelling the gases from vent pipe 104 into the atmosphere. In some instances, the vent pipe 104 of more than one AST 102 may be connected in a system of multiple interconnected vent pipes 104. As used herein, the vent pipe system and vent pipe are referred to interchangeable as vent pipe 104.

Vent fires 106 take place in vent valve 112 when flammable vapor released from the vent pipe 104 gets ignited. Lightning is a leading cause of fires in AST vent valves, accounting for approximately one-third of all incidents. A direct strike can ignite flammable vapors exiting the vent valve 112, which if left unchecked, can lead to a fire or explosion in AST 102.

Existing fire prevention and extinguishing methods for AST vent valves include:

- Dry chemical fire extinguishers: These are suitable for small vent fires, but are ineffective for larger tank fires.
- Flame arresters: These devices are installed on vent pipes to prevent flames from entering the tank.
- Pressure/vacuum vents: These vents regulate pressure within the tank and can help to minimize vapor emissions.

However, these existing methods have limitations. Flame arresters can become clogged or damaged, reducing their effectiveness. Pressure/vacuum vents may not fully address the risk of ignition at the vent pipe itself. Dry chemical fire extinguishers, when deployed by a human element 108, can place the human 108 in extreme danger as the human 108 often must use the extinguisher at height and in proximity of the vent fire 106.

For example, a ladder structure 110 may be constructed adjacent to AST 102 to allow human 108 to come adjacent for applying the dry chemical to extinguish fire 106.

Unfortunately, when human 108 intervention is used to extinguish fire 106, then human 108 is placed in increased danger. For example, when human 108 has to climb a ladder positioned high above ground the chances of human 108 falling is increased. Additionally, human 108 is also placed in increased danger in instances where tank 104 catches fire as human 108 is attempting to extinguish fire 106.

There is a need for a safer, more reliable and effective method for extinguishing fires at vent pipes and vent valves on ASTs that does not place humans in increased danger.

SUMMARY OF THE INVENTION

The present invention discloses a system for extinguishing fires that develop in a vent valve of above ground storage tanks storing flammable liquid. Although the invention is described with respect to above ground tanks used in the oil and gas industry, the invention applies to any environment wherein above ground tanks are used to store flammable liquids, wherein the above ground tanks use vent pipes to expel flammable gasses. Therefore, the description of the is made to facilitate understanding of the invention, and not by way of limitation.

The invention includes a vent pipe extinguisher positioned in-line with a vent pipe vent valve. In one aspect, the vent pipe extinguisher may be positioned in-line with the with a vent pipe system, but below the vent valve.

In one aspect of the invention, the vent pipe extinguisher may include a vent pipe housing, wherein the perimeter of the vent pipe housing. The vent pipe extinguisher housing may be of the same diameter or circumference of, or greater than the diameter or circumference of, the vent pipe.

In another aspect of the invention, the vent pipe extinguisher may be removably affixed to the vent pipe. The vent pipe extinguisher housing may be affixed to the vent pipe by, for example, using a configuration whereby the vent pipe extinguisher housing mates with the vent pipe using, for example, screws, threads, a turn and lock mechanism, simple push connection, or the like. The housing may further include a channel that proceeds from a vent pipe extinguisher housing first end to a vent pipe extinguisher housing second end, such that, the channel permits the free flow of gases from the vent pipe through the vent pipe housing.

In yet another aspect, the housing may include a rotating door affixed to an inner surface of the housing channel for preventing the free flow of gas from the vent pipe into the vent pipe extinguisher housing. The rotating door may be rotatable affixed the vent pipe extinguisher housing allowing the door to rotate to a down position. The door may be configured such that when the door is in a down position, the door completely covers or overlays the vent pipe affixed to the vent extinguisher housing thereby preventing the free flow of gases from the vent pipe not the housing. In another aspect, the door may be further configured to permit the free flow of gases through the vent pipe extinguisher housing when the door is rotated upward in an open position.

In still another aspect of the invention, the vent pipe extinguisher housing may include a vent pipe extinguisher housing third opening. Vent pipe extinguisher housing third opening may include a grommet for preventing the gases from escaping vent pipe extinguisher housing third opening.

In a further aspect of the invention, the grommet may enclose a vent pipe extinguisher pipe. The vent pipe extinguisher pipe may open into the vent pipe extinguisher housing. In another aspect, the vent pipe extinguisher pipe may be configured to provide material into an inner cavity of the vent pipe extinguisher housing for extinguishing a fire at the vent valve.

The vent pipe extinguisher pipe may be comprised a vent pipe extinguisher pipe first end having vent pipe extinguisher pipe first opening and a vent pipe extinguisher pipe second end having a vent pipe extinguisher pipe second opening. The vent pipe extinguisher pipe first end may be in communication with and surrounded by the grommet.

In another aspect of the invention, the vent pipe extinguisher pipe second end may be in communication with an inert gas source. Inert gas may be provided to the vent pipe extinguisher pipe second end and may be further provided to the vent pipe extinguisher pipe first end and into the vent pipe extinguisher housing.

In still another aspect of the invention, the vent pipe extinguisher may further include a tag line having a tag line first end and a tag line second end. The tag line first end may be affixed to the door. The tag line may be further removably affixed to a tag. The position of the tag relative to the tag line may indicate the position of the door (e.g., open or closed, up or down). In another aspect, the position of the tag indicates whether the vent pipe extinguisher of the present invention has been activated.

The present invention includes an apparatus extinguishing a vent valve fire in an above ground storage tank vent pipe comprising:

a. a housing, the housing including
   1. a housing first open end, wherein the housing first open end is affixed to an above ground storage tank vent valve,
   2. a housing second open end,
   3. a housing first aperture,
   4. a housing second aperture,
   5. a housing channel formed from the housing first open end to the housing second open end, wherein the housing second open end is attachable to an above ground storage tank vent pipe, wherein the vent pipe is configured to provide gasses through the housing second open end, and b. a door inside the housing channel, the door having a door first end and a door second end, wherein the door second end is rotatably attached to the housing channel in proximity to the housing second open end, wherein the door is rotatable from an open position to a closed position, c. a pipe, the pipe having a pipe first open end and a pipe second open end, wherein the pipe first open end is in communication with the housing aperture, d. an inert gas source in communication with the pipe second open end, the inert gas source for providing an inert gas to said pipe second open end, wherein the inert gas source provides the inert gas through the pipe to the pipe first open end and into the housing channel, e. a tagline having a tagline first end and a tagline second end, wherein the tagline included in the housing second aperture, wherein the tagline second end is detachably affixed to the door first end, and f. a tag removably attached to the tagline first end.

In another embodiment, the invention includes, an apparatus extinguishing a vent valve fire in an above ground storage tank vent pipe comprising:

a. a housing, the housing including
   1. a housing first open end, wherein the housing first open end is affixed to an above ground storage tank vent valve,
   2. a housing second open end,
   3. a housing first aperture,
   4. a housing second aperture,
   5. a housing channel formed from the housing first open end to the housing second open end, wherein the housing second open end is attachable to an above ground storage tank vent pipe, wherein the vent pipe is configured to provide gasses through the housing second open end, b. a door inside the housing channel, the door having a door first end and a door second end, wherein the door second end is rotatably attached to the housing channel in proximity to the housing second open end, wherein the door is rotatable from an open position to a closed position,
c. a pipe, the pipe having a pipe first open end and a pipe second open end, wherein the pipe first open end is in communication with the housing aperture,
d. an inert gas source in communication with the pipe second open end, the inert gas source for providing an inert gas to said pipe second open end, wherein the inert gas source provides the inert gas through the pipe to the pipe first open end and into the housing channel,
e. a tagline having a tagline first end and a tagline second end, wherein the tagline included in the housing second aperture, wherein the tagline second end is detachably affixed to the door first end, and
f. an electromechanical device detachably affixed to the tagline, the electromechanical deice having:
   1. A temperature sensor for sensing the temperature at the vent valve, and for providing temperature sensor data relative to the temperature at the vent valve,
   2. a microprocessor for receiving the temperature sensor data and providing a control signal, and
   3. a grasping device in communication with the microprocessor, the grasping device for releasably holding the tagline first end.

BRIEF DESCRIPTION OF THE DRAWINGS

A more complete understanding of the present invention may be derived by referring to the various embodiments of the invention described in the detailed descriptions and drawings and figures in which like numerals denote like elements, and in which.

DETAILED DESCRIPTION OF THE INVENTION

Figure 1:
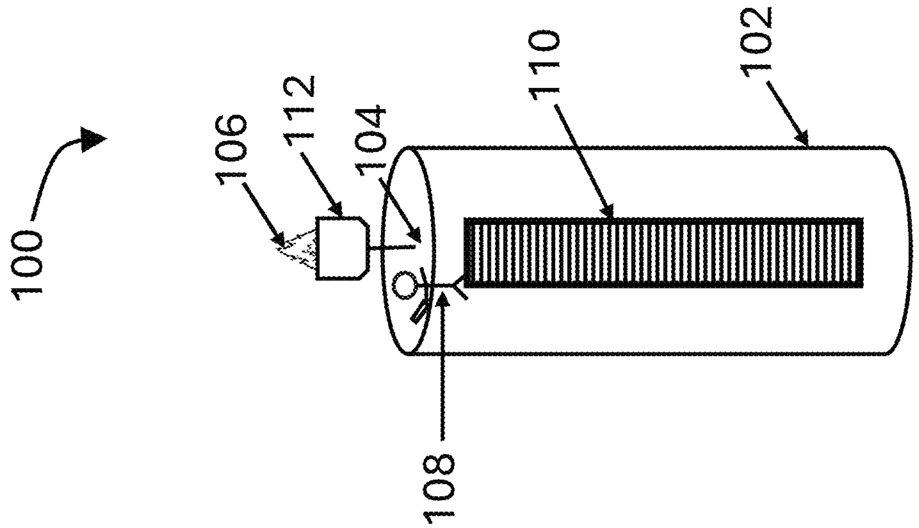
FIG. 1 is a depiction of the typical environment using an above ground storage tank, in which the present invention may be used.

The detailed description refers to accompanying drawings, which show the exemplary embodiments of the invention by way of illustration and its best mode. While these exemplary embodiments are described in sufficient detail to enable those skilled in the art to practice the invention, other embodiments may be realized. Indeed, one skilled in the art will understand that logical and mechanical changes may be made to the invention without departing from the invention's spirit and scope.

While the present invention is described with respect to oil and gas operations, the invention is applicable to environments using above ground storage tanks that store flammable liquids. The invention is applicable to environments where the above ground tanks use vent pipes.

The present invention may be described herein in terms of functional block components and various processing steps. It should be appreciated that such functional blocks may be realized by any number of hardware and/or software components configured to perform the specified functions. For example, the present invention may employ various integrated circuit (IC) components (e.g., memory elements, processing elements, logic elements, look-up tables, and the like), which may carry out a variety of functions under the control of one or more microprocessors or other control devices. Similarly, the software elements of the present invention may be implemented with any programming or scripting language such as C, C++, java, COBOL, assembler, PERL, any form of electromechanical or automation programming, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a scripting language, such as JavaScript, VBScript or the like.

The implementations shown and described herein are illustrative of the invention and its best mode and are not intended to otherwise limit the scope of the present invention in any way. Indeed, for the sake of brevity, conventional wireless data transmission, transmitter, receivers, modulators, base station, data transmission concepts and other functional aspects of the systems (and components of the individual operating components of the systems) may not be described in detail herein. Furthermore, the connecting lines shown in the various figures contained herein are intended to represent exemplary functional relationships and/or physical couplings between the various elements. It also should be noted that many alternative or additional functional relationships or physical connections may be present in a practical electronic transaction or file transmission system. Additionally, where elements of the invention are described as communicating with, or in communication with, the invention contemplates direct communication between components or communicating through one or more communicating or connected components.

Figure 2:
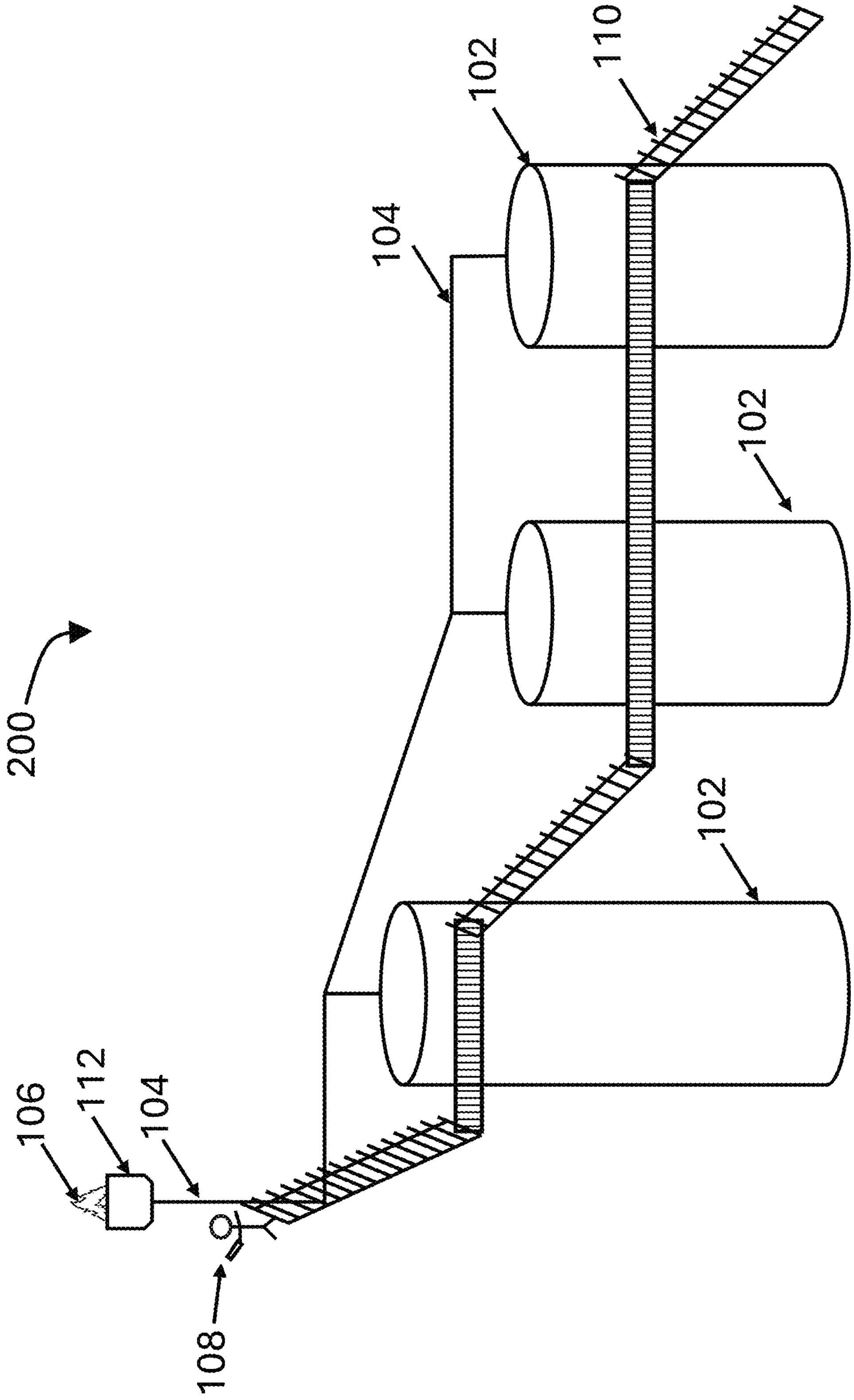
FIG. 2 is a depiction of the typical oil and gas environment using an above ground storage tank, in which the present invention may be used.

The present invention teaches a vent pipe extinguisher system 201 for extinguishing fires at a vent pipe vent valve 112. FIG. 1 and FIG. 2 depict the typical environments in which the vent pipe extinguisher system 201 may be used. Like elements in FIG. 1 and FIG. 2 are indicated by like numerical character references.

Vent pipe extinguisher system 201 may further include a vent pipe extinguisher 202 positioned in-line with vent pipe 104. Vent pipe extinguisher 202 may be positioned in-line with a vent pipe 104, but below the vent valve 112.

Vent pipe extinguisher 202 may be further connected to a vent pipe extinguisher pipe 206. Vent pipe extinguisher pipe 206 may be comprised of metals like steel, aluminum, corrugated metals, or plastics like PVC, and the like. Indeed, vent extinguisher pipe 206 may be comprised of any suitable material for transporting a gas or other fluid composite for extinguishing a fire.

Vent pipe extinguisher pipe 206 may be further connected to an inert gas source 204 for providing an inert gas to vent pipe extinguisher pipe 206. Inert gas provided by inert gas source 204 may be for example, carbon dioxide (CO2), nitrogen dioxide (N2), argon (Ar), or the like. While the source is described as an inert gas source, the source may provide any dry or wet chemical capable of traveling through vent pipe extinguisher pipe 206.

Figure 3:
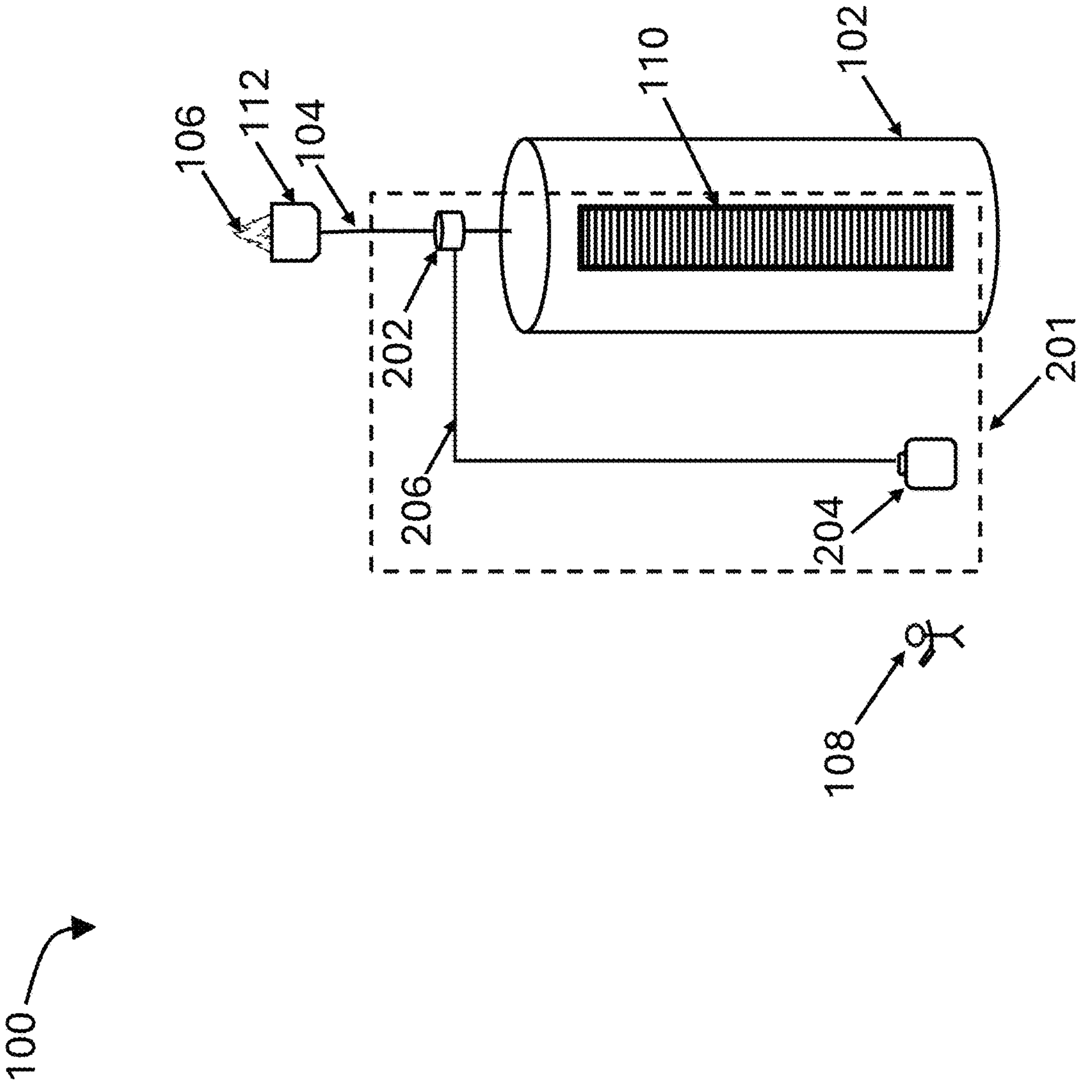
FIG. 3 is a depiction of a vent pipe extinguisher according to the present invention being used in a conventional above ground storage tank environment.
Figure 4:
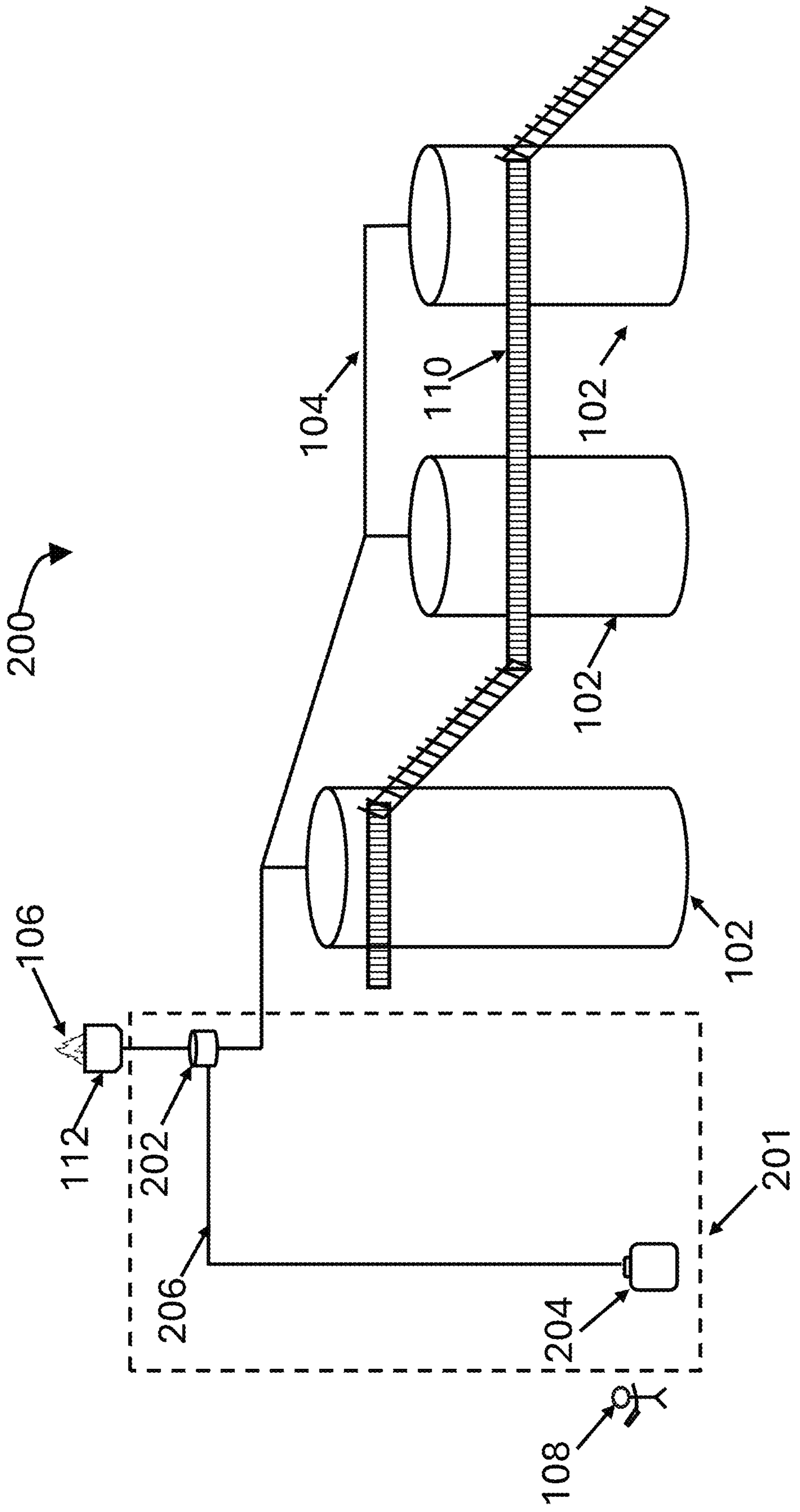
FIG. 4 is a depiction of a vent pipe extinguisher according to the present invention being used in a conventional oil and gas above ground storage tank environment.
Figure 5:
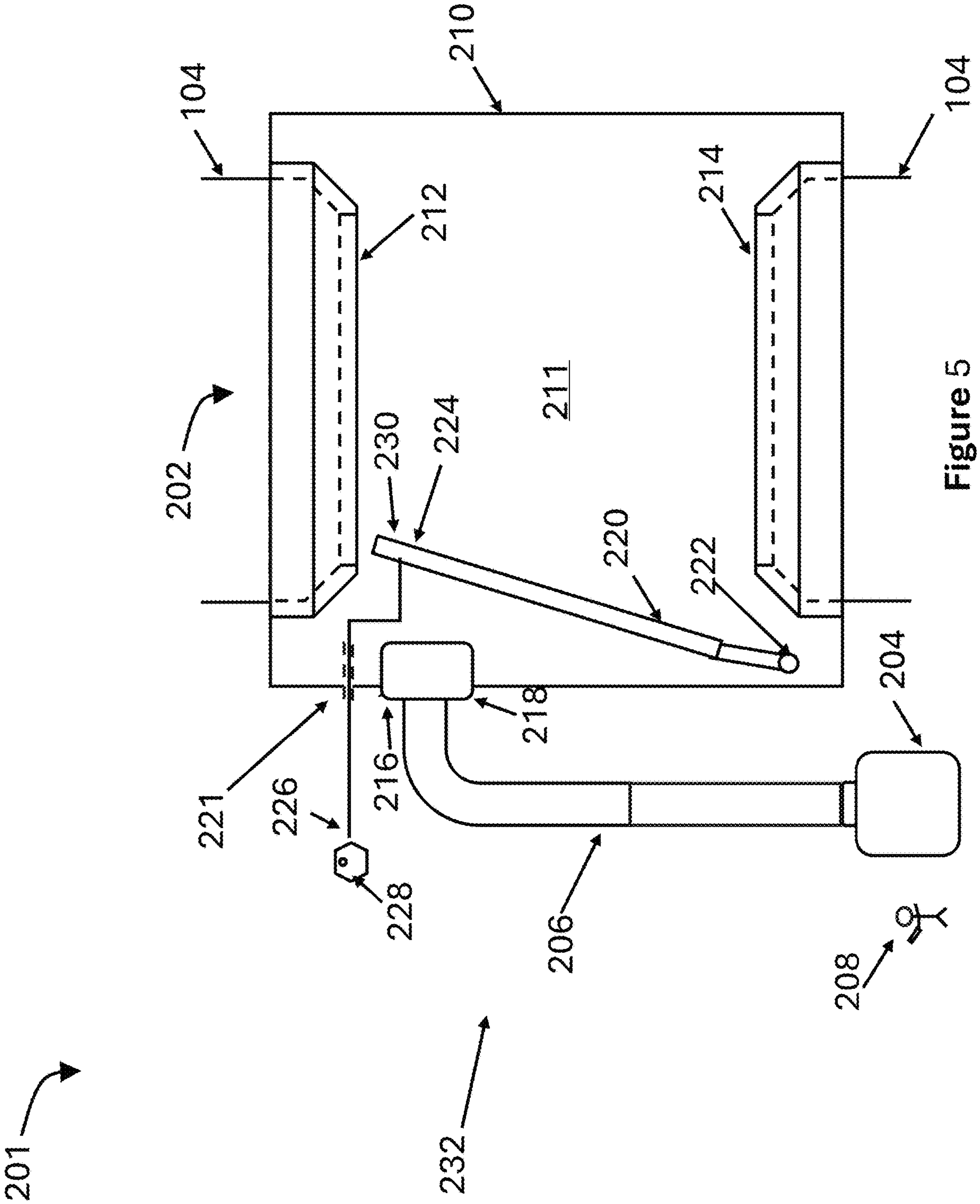
FIG. 5 is a depiction of a vent pipe extinguisher according to the present invention showing the door in an open position.
Figure 6:
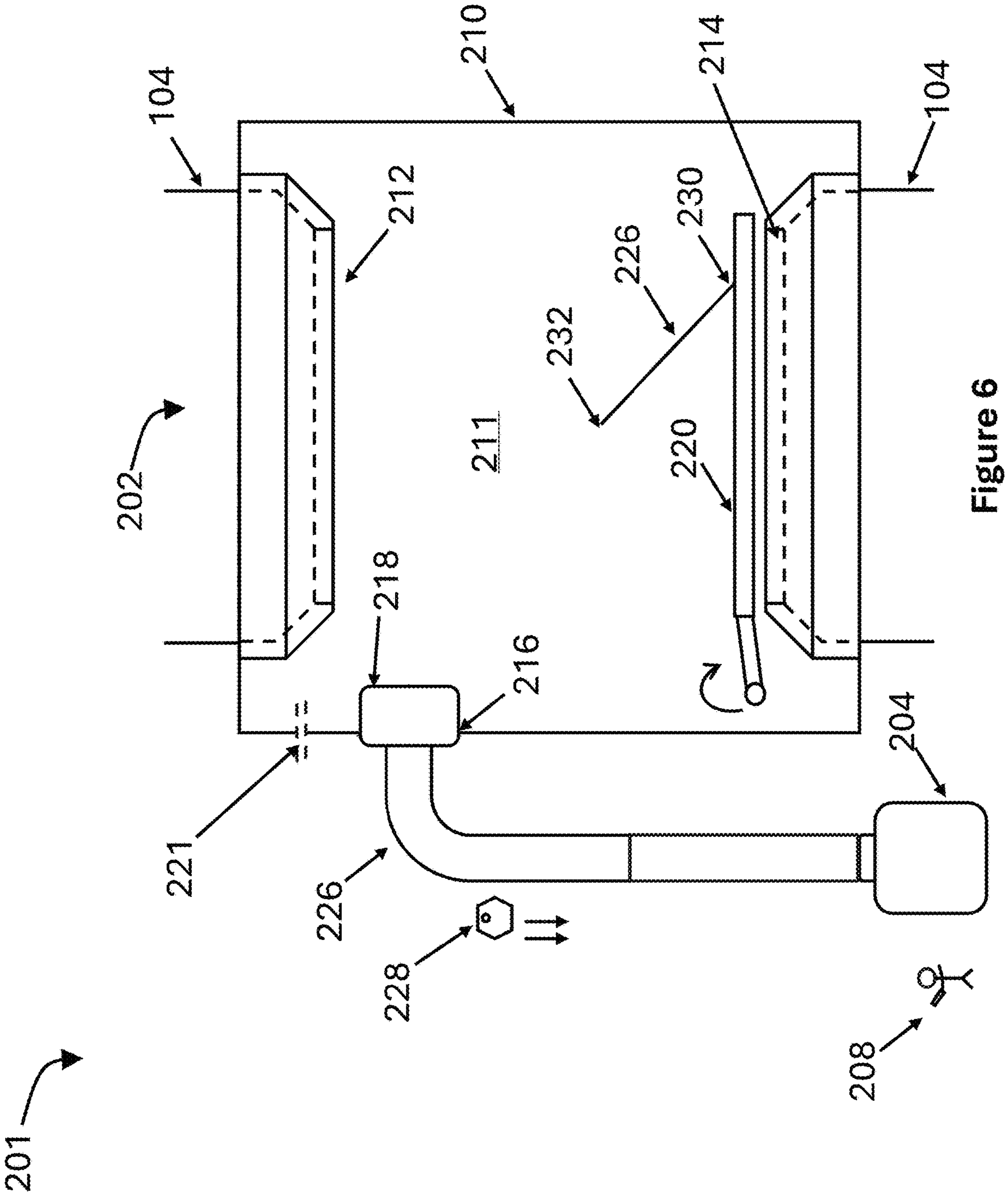
FIG. 6 is a depiction of a vent pipe extinguisher according to the present invention showing the door in a closed (e.g., down) position.
Figure 7:
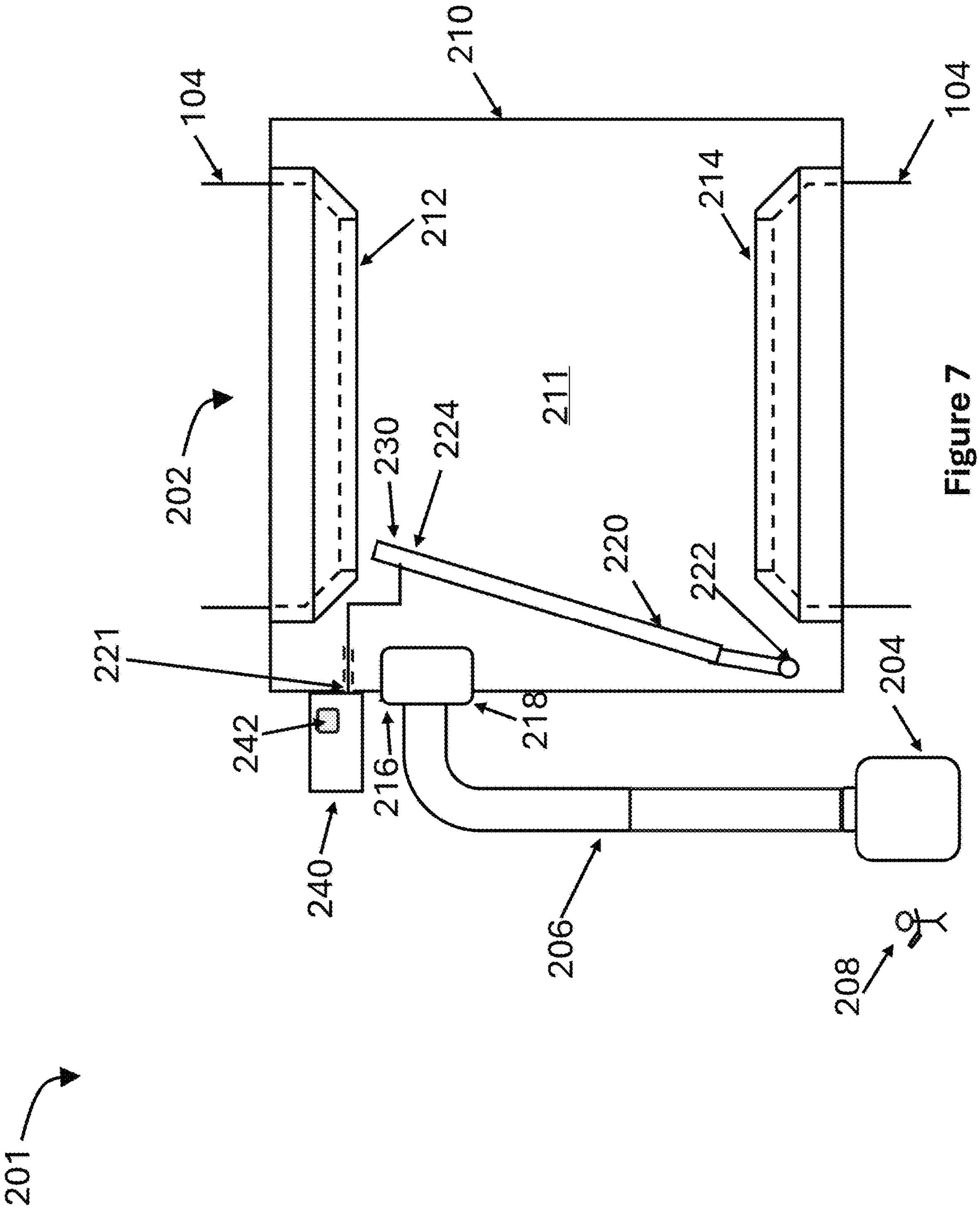
FIG. 7 is a depiction of a vent pipe extinguisher according to the present invention using an electromechanical device for controlling the position of the door.

FIG. 3 and FIG. 4 depict vent pipe extinguisher system 201 in line with vent pipe 104. With reference to FIG. 5, FIG. 6, and FIG. 7, vent pipe extinguisher system 201 includes a vent pipe extinguisher 202. Vent pipe extinguisher 202 is comprised of a vent pipe extinguisher housing 210. Vent pipe extinguisher housing 210 may have a vent pipe housing perimeter that is the same perimeter of, or greater than the perimeter of, the vent pipe 104. Vent pipe extinguisher housing 210 may be configured to mate with vent pipe 104, using, for example, screws, threads, a latch and turn, a push attachment or the like.

In one embodiment, vent pipe extinguisher housing 210 may include a vent pipe extinguisher housing second open end 214, and a vent pipe extinguisher housing first open end 212. Vent pipe extinguisher housing 210 has a channel 211 formed between vent pipe extinguisher housing second open end 214 and vent pipe extinguisher housing first open end 212. When placed in communication with vent pipe 104, such as when connected in-line with vent pipe 104, vent pipe extinguisher housing second open end 214 is in communication with a portion of vent pipe 104 nearest AST 102 and vent pipe extinguisher housing first open end 212 may be in communication with a portion of vent pipe 104 nearest vent valve 112. Vent pipe extinguisher housing first open end may be connected to the portion of the vent pipe 104 using the attachment means described above.

In another exemplary embodiment, vent pipe extinguisher housing first open end 212 may be in communication with vent valve 112. vent pipe extinguisher housing first open end 212 may be affixed to vent valve 112 using the attachment means discussed with respect to vent pipe 104.

Gas proceeding from AST 102 and through vent pipe 104 may proceed through vent pipe extinguisher housing channel 211. Specifically, the gas may be transmitted through vent pipe extinguisher housing second open end 214, through vent pipe extinguisher housing channel 211, through vent pipe extinguisher housing first open end 212, through vent valve 112, and finally, into the atmosphere.

Vent pipe extinguisher housing 210 may further include a vent pipe extinguisher housing third opening 216. Vent pipe extinguisher housing third opening 216 may include a vent pipe extinguisher pipe 206 included in vent pipe extinguisher housing third opening 216. In one embodiment, a grommet 218 may surround vent pipe extinguisher pipe 206 to prevent gases traversing through vent pipe extinguisher housing 210 from escaping vent pipe extinguisher housing channel 211. Grommet 218 may be any conventional grommet as is found in the plumbing and construction industries.

In one exemplary embodiment, vent pipe extinguisher pipe 206 may be further connected to an inert gas source 204. The vent pipe extinguisher pipe 206 may be comprised a vent pipe extinguisher pipe 206 first end having vent pipe extinguisher pipe 206 first end and a vent pipe extinguisher pipe 206 second end.

In yet another embodiment of the invention, vent pipe extinguisher pipe 206 second end may be in communication with inert gas source 204. Inert gas source 204 may provide an inert gas into the vent pipe extinguisher pipe 206. The inert gas may travel from vent pipe extinguisher pipe 206 second end to the vent pipe extinguisher pipe 206 first end. The inert gas may flow through the vent pipe extinguisher pipe 206 second end and may enter the vent extinguisher housing 210. More specifically, the inert gas may enter into vent pipe extinguisher channel 211.

Inert gas source 204 may be any high pressure or low pressure system capable of delivering an inert gas to a pipeline. Suitable inert gasses that may be used with this invention include nitrogen (N2), argon (Ar), carbon dioxide (CO2), and similar gases used in extinguishing fires. In one exemplary embodiment, inert gas source 204 may include a pressure vessel or cylinder containing an inert gas. Vent pipe extinguisher 206 second end may be in communication with inert gas source using any conventional means for connecting a pipeline to a container of inert gas.

The invention teaches extinguishing a fire at a vent valve 112 by, for example, restricting or eliminating the flow of ignitable gases that are fueling the fire. In one exemplary embodiment, the invention includes a door 220 rotatably affixed to the housing channel 211. Door 220 may be configured to overlay vent pipe extinguisher housing second open end 214, thereby preventing gas from traveling from vent pipe 104 and into vent pipe extinguisher housing channel 211. In one embodiment, door 220 may be in the shape of vent pipe extinguisher housing second open end 214 such that it may seal vent pipe extinguisher housing second open end 214 restricting the movement of flammable gases.

Door 220 may include a door first end 224 and a door second end 222. Door 200 may be rotatably connected to vent pipe extinguisher housing channel 211 at door second end 222. Door 200 may be rotatably connected to vent pipe extinguisher housing channel 211, such that, door 200 may rotate to overlay vent pipe extinguisher housing second open end 214. As used herein, door 200 is described as being closed, or in a down or downward position, when door 200 has rotated toward vent pipe extinguisher housing second open end 214. Door 200 is described as being in the open, or up or in an upward position when door 200 is a position that does not overlay vent pipe extinguisher housing first open end 214.

Door second end 222 may be affixed adjacent to vent pipe extinguisher housing second open end 214. Door second end 222 may be affixed to a side wall of channel 211. Door second end 222 may be affixed using any conventional method for rotatably affix two distinct components.

Vent pipe extinguisher system 200 may further include a tag line 226 having a tag line first end 228 and a tag line second end 230. Tag line 226 may be included in a housing aperture 221. Tag line second end 230 may be affixed to door first end 224. Tag line second end 230 may be removably affixed to door first end 224. In one embodiment, tag line 226 may proceed through vent pipe extinguisher housing 210 at vent pipe extinguisher housing aperture 221, such that tag line first end 228 is outside of vent pipe extinguisher housing 210.

Tag line 226 may be further include a means for indicating the position of door 220. By position of door 220, what is meant is that the door is in one of up or down, open or closed, position. The means for indicating the door 220 position may be a mechanical indicator (e.g., a nonelectric tag) or electromechanical indicator (e.g., including auditory or electronically induced visual indicators).

In one embodiment, the means for indicating door 220 position may be a nonmechanical tag 232. Tag 232 may be in communication with tag line first end 228. Tag 232 may be removably affixed to a tag line first end 228.

The present invention may be placed in operation when a fire 106 develops at vent valve 112. During operation, inert gas source 204 may provide an inert gas to vent pipe extinguisher pipe 206. Vent pipe extinguisher pipe 206 may further provide the inert gas into vent pipe extinguisher housing channel 211.

Inert gas source 204 may provide the inert gas to vent pipe extinguisher housing channel 211 in such manner as to initiate door 220 to rotate from an open or up position to a closed or down position. In one embodiment, the down position may include when door 220 is overlaying vent pipe extinguisher first open end 214. When door 220 rotates to the closed (e.g., down) position, tag 232 may be detached from the tag line second end 228. In one embodiment, once tag 232 is detached from tag line second end 228, door 220 is permitted to rotate in a downward position.

As noted, in the down position, door 220 closes off the vent pipe extinguisher housing second open end 214 by covering vent pipe extinguisher housing second open end 214 to prevent exhaust gas from entering the vent extinguisher housing channel 211 from the vent pipe 104.

In one embodiment, when the tag 232 detaches from tag line first end 228, tag 232 is displaced from a position adjacent to vent pipe extinguisher housing 210. The displacement of tag 232 may indicate the position of door 220.

Figure 8:
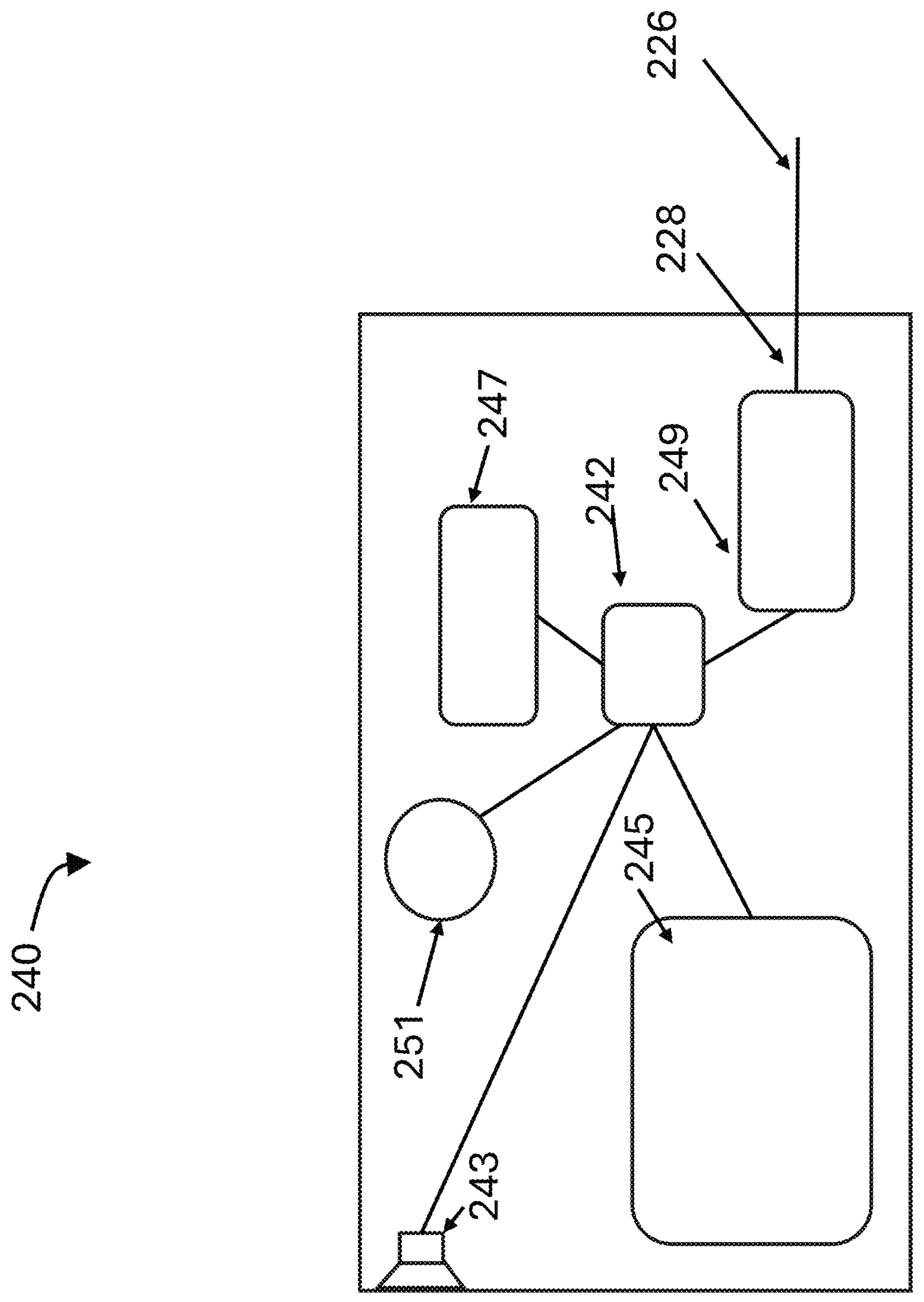
FIG. 8 is a depiction of an electromechanical device for detecting temperature at a vent valve and releasing the housing door to a down position.

FIG. 7 depicts a vent pipe extinguisher system 200 according to the present invention wherein the means for indicating door 220 position includes an electromechanical indicator 240. Electromechanical indicator 240 (shown in FIG. 8) may include various conventional components configured to receive temperature data from vent valve 112, and communicate the temperature data. For example, electromechanical indicator 240 may include a temperature sensor 247 for sensing and reporting data indicative of the temperature at vent valve 112. Temperature sensor 247 may be any conventional device for sensing temperature and reporting temperature data as may be found in the art. Sensor 247 may be in communication with a speaker 243 for receiving the temperature data and sending an audibly signal relative to the temperature sensed at vent valve 212.

Temperature sensor 247 may send temperature data to a visual indicator 245. Visual indicator 245 may be configured to receive temperature data and visually indicating the temperature at vent valve 212. Visual indicator 245 may be any convention device or system including lights that change relative to the temperature data received.

Electromechanical indicator 240 may further include a grasping device 249 for holding and releasing tag line second end 228. Grasping device 249 may be in communication with tag line first end 228. Grasping device 249 may be configured to grasp or release tag line second end 228 in response to the temperature data received. That is, the grasping device 249 may release the Grasping device 249 may be any device capable of performing the function described herein.

In one example, electromechanical indicator 240 may be configured to determine when the temperature at vent valve 112 has risen to the level indicating that a fire 106 exists at vent valve 112. Electromechanical indicator 240 may further be detachably affixed to tag line second end 228 in response to the temperature data sensed at vent valve 112. In one embodiment, when sensor 247 detects a fire 106 at vent valve 112 (e.g., sensor 247 has sensed that the temperature at vent valve 112 is above a predetermined temperature), grasping device 249 releases tag line 226. When grasping device 249 releases tag line 226, door 220 may rotate relative to door first end 222 to a downward position.

In another exemplary embodiment, electromechanical indicator 240 may further include electronics 242 that are configured to transmit a signal indicating that vent pipe 112 is on fire, or door 220 is in a closed position. Electronics 242 may include microprocessor 242 for receiving temperature data or data related to the position of the door and producing a control signal. Electronics 242 may include a transmitter/receiver module that may be configured to wirelessly send/receive a data signal to/with inert gas source 204 for activating inert gas source 204 for providing inert gas to vent pipe extinguisher pipe 206.

During one embodiment, electronics 242 may detect a temperature change at vent valve 112 indicating that a fire 106 exists at vent valve 112. Electronics 242 may then wirelessly send data to inert gas source 204 to activate inert gas source 204 to provide inert gas to vent pipe extinguisher pipe 206 and subsequently to vent pipe extinguisher housing channel 211. Electromechanical indicator 240 may additionally release tag line first end 228 permitting door 220 to rotate to a closed position.

Microprocessor 242 may additionally include electronics for providing a control signal to a housing speaker 243 for causing speaker 243 to emit an auditory signal when vent valve 112 is on fire, or the state or position of door 220. Microprocessor 242 may include visual indicators, such as, lights 251 which visibly indicate, for example, that inert gas source 204 has been activated to provide inert gas to vent pipe extinguisher pipe 206.

The present description details exemplary embodiment of the invention such that one skilled in the art understands. For the sake of brevity, conventional electronics such as temperature sensors, release latches for the tag line, wireless data transmission, and the like are not described herein. However, one skilled in the art will understand how conventional electronics may be used in the present invention according to this disclosure.

I claim:

1. An apparatus extinguishing a vent valve fire in an above ground storage tank vent pipe comprising:

- a. a housing, the housing including
  - 1) a housing first open end, wherein the housing first open end is affixed to an above ground storage tank vent valve,
  - 2) a housing second open end,
  - 3) a housing first aperture,
  - 4) a housing second aperture,
  - 5) a housing channel formed from the housing first open end to the housing second open end, wherein the housing second open end is attachable to an above ground storage tank vent pipe, wherein the vent pipe is configured to provide gasses through the housing second open end, and
- b. a door inside the housing channel, the door having a door first end and a door second end, wherein the door second end is rotatably attached to the housing channel in proximity to the housing second open end, wherein the door is rotatable from an open position to a closed position,
- c. a pipe, the pipe having a pipe first open end and a pipe second open end, wherein the pipe first open end is in communication with the housing first aperture, d. an inert gas source in communication with the pipe second open end, the inert gas source for providing an inert gas to said pipe second open end, wherein the inert gas source provides the inert gas through the pipe to the pipe first open end and into the housing channel, e. a tagline having a tagline first end and a tagline second end, wherein the tagline included in the housing second aperture, wherein the tagline second end is detachably affixed to the door first end, and f. a tag removably attached to the tagline first end.

2. An apparatus according to claim 1, wherein the inert gas source is storage tank.

3. An apparatus according to claim 1, wherein the door moves from an open position to a closed position when the tag is detached from the tagline first end.

4. An apparatus according to claim 3, wherein the door moves from an open position to a closed position to overlay the housing second open end when the tag is detached from the tagline first end.

5. An apparatus according to claim 3, wherein the tag is detached from the tagline first end when the inert gas source provides inert gas to pipe second open end.

6. An apparatus extinguishing a vent valve fire in an above ground storage tank vent pipe comprising:

a. a housing, the housing including 1) a housing first open end, wherein the housing first open end is affixed to an above ground storage tank vent valve, 2) a housing second open end, 3) a housing first aperture, 4) a housing second aperture, 5) a housing channel formed from the housing first open end to the housing second open end, wherein the housing second open end is attachable to an above ground storage tank vent pipe, wherein the vent pipe is configured to provide gasses through the housing second open end, b. a door inside the housing channel, the door having a door first end and a door second end, wherein the door second end is rotatably attached to the housing channel in proximity to the housing second open end, wherein the door is rotatable from an open position to a closed position, c. a pipe, the pipe having a pipe first open end and a pipe second open end, wherein the pipe first open end is in communication with the housing first aperture, d. an inert gas source in communication with the pipe second open end, the inert gas source for providing an inert gas to said pipe second open end, wherein the inert gas source provides the inert gas through the pipe to the pipe first open end and into the housing channel, e. a tagline having a tagline first end and a tagline second end, wherein the tagline included in the housing second aperture, wherein the tagline second end is detachably affixed to the door first end, and f. an electromechanical device detachably affixed to the tagline, the electromechanical device having:

a. a temperature sensor for sensing the temperature at the vent valve, and for providing temperature sensor data relative to the temperature at the vent valve, b. a microprocessor for receiving the temperature sensor data and providing a control signal, and c. a grasping device in communication with the microprocessor, the grasping device for releasably holding the tagline first end.

7. An apparatus according to claim 6, wherein the inert gas source is storage tank.

8. An apparatus according to claim 7, wherein the door moves from an open position to a closed position to overlay the housing second open end when the tag is detached from the tagline first end.

9. An apparatus according to claim 8 further including an electromechanical device detachably affixed to the tagline, the electromechanical device having:

a. a temperature sensor for sensing the temperature at the vent valve, and for providing temperature sensor data relative to the temperature at the vent valve, b. a microprocessor for receiving the temperature sensor data and providing a control signal, and c. a grasping device in communication with the microprocessor, the grasping device for releasably holding the tagline first end.

10. An apparatus according to claim 9, wherein the grasping device receives the control signal and releases the tagline first end when the temperature sensor senses a predetermined temperature.

11. An apparatus according to claim 10, further including a visual indicator, wherein the visual indicator receives the control signal and provide a visual indication of the temperature data.

12. An apparatus according to claim 10, further including a speaker, wherein the speaker receives the control signal and provides an audible signal corresponding to the temperature data.

13. An apparatus according to claim 9, wherein the grasping device receives the control signal and releases the tagline first end when the inert gas source provides inert gas to pipe second open end.

14. An apparatus according to claim 6, wherein the door moves from an open position to a closed position when the tag is detached from the tagline first end.

* * * * *